3,106,811
POWERED GANG LAWN MOWER
Sherman C. Heth and Sahag C. Akgulian, Racine, Wis., assignors to Jacobsen Manufacturing Co., Racine, Wis., a corporation of Wisconsin
Filed May 16, 1962, Ser. No. 195,294
7 Claims. (Cl. 56—7)

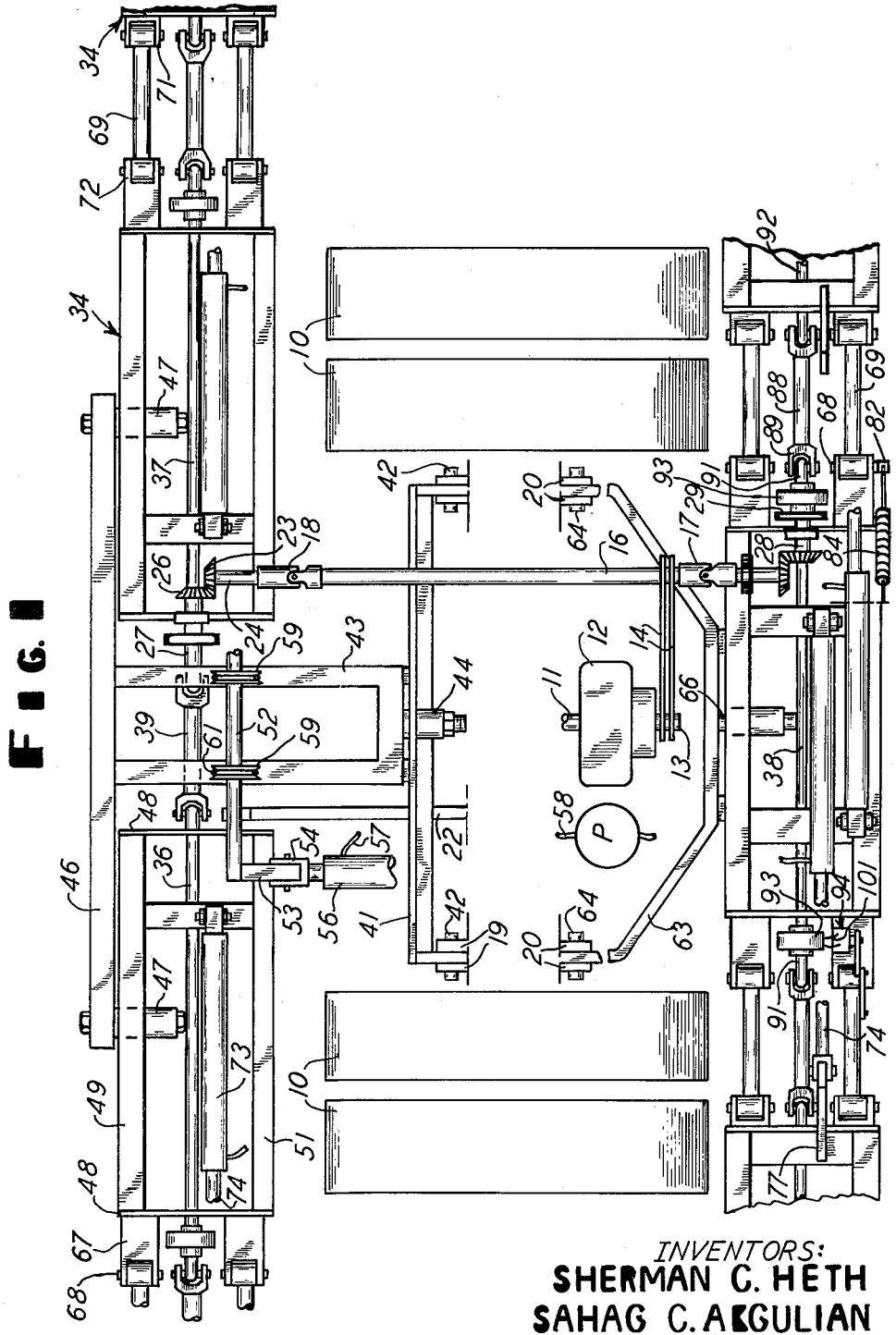

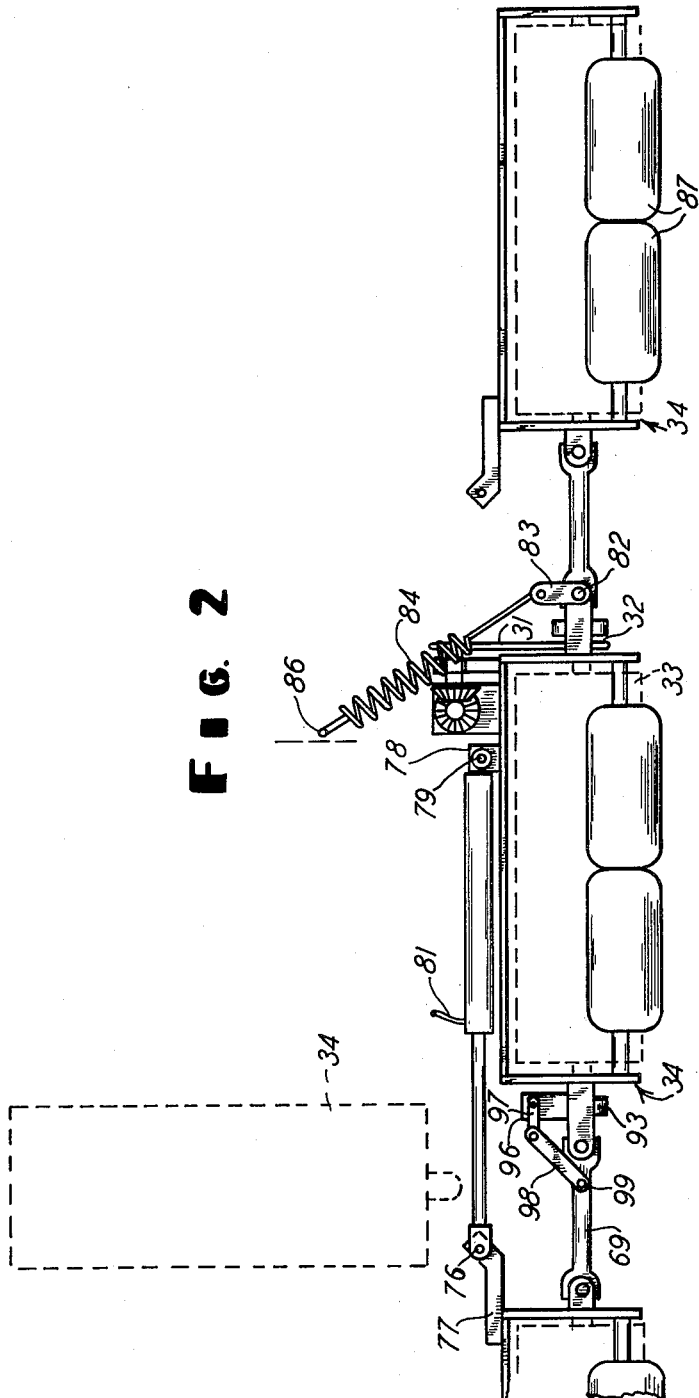

This invention relates to tractor mounted gang lawn mowers.

It is an object of this invention to provide a multiple number of lawn mowers mounted on a tractor such that all of the mowers are conveyed and also powered off the tractor, and the individual mowers are completely articularly mounted for pivotal movement with respect to the tractor to conform to the ground irregularities of the lawns being mowed, and also wherein the mowers are power controlled so that they can be raised and lowered. In accomplishing the aspects of this particular object, it is to be further understood that the manufacture of the various components is relatively inexpensive and yet the components are sufficiently sturdy to perform the rugged task of gang mowing, and also the components are not unduly complex so they are commercially feasible.

Still another and even more particular object of this invention is to provide gang lawn mowers for mounting onto a tractor such that the laterally disposed mowers, with respect to the fore-and-aft axis of the tractor, can be individually raised and lowered with respect to their mowing positions, and, when they are raised, the power supplied to the mower for operating same is automatically interrupted so the cutting element of the mower is not moved when the mower is in the raised inoperative position. This particular object, of course, permits both a safety feature and an economical feature as well as a wear and tear avoidance with respect to the mower since the raised mowers are not operating.

Still a further object of this invention is to provide a gang type tractor mounted lawn mower wherein the mowers can be raised individually at the outer or outboard locations and the power driving these mowers will then be automatically interrupted.

Still another object of this invention is to provide a reel type of lawn mower wherein the laterally disposed mowers can be independently raised and the weight of these mowers is not then fully transferred to the inwardly disposed mowers, but instead this weight is at least partly then supported on the tractor when the mower is in the raised position. In accomplishing this particular object, the mowers are articulated with respect to each other and also they are firmly supported for sustaining the necessary towing force applied to the mowers, and still the mowers are all powered with respect to reel rotation and the laterally disposed lawn mowers are powered with respect to raising and lowering the same between the mowing and the transport positions.

Other objects and advantages will become apparent upon reading the following description in light of the accompanying drawings, wherein:

FIG. 1 is a plan view of a fragment of one embodiment of this invention and showing it related to a tractor on which it is mounted.

FIG. 2 is a rear elevational view of the embodiment shown in FIG. 1 with a part thereof broken away and with a second position of one reel shown in dotted lines.

The drawings in FIG. 1 indicate the supporting tractor by showing the rear wheels 10 which of course suitably mount the conventional and well-known tractor power-take-off shaft 11 which extends into a housing 12 for transmitting the input of the shaft 11 to an output shaft 13. The tractor further consists of driving belts 14 which rotate a driving shaft 16 having universal joints 17 and 18 at the opposite ends of the shaft 16. It will of course be further understood that the universal joints 17 and 18 are of a conventional type which includes splines for sliding the respectively engaged shafts with the joints 17 for a purpose more apparent later. Still further, the tractor is shown to include mounting plates or ears 19 and 20 with two pairs of the ears 19 being forwardly mounted and two pairs of the ears 20 being rearwardly mounted on the tractor. Still further, a supporting member 22 is mounted on the tractor to extend forwardly therefrom for a purpose mentioned later.

It will therefore readily be understood by one skilled in the art that a conventional type of tractor is provided, and it has the well-known elements mentioned, and all will thus be understood and apparent to one skilled in the art upon reading the remainder of this disclosure.

It will therefore be understood that the shaft 16 is rotated off the power of the tractor, and such power is taken from the tractor power-take-off shaft 11, rather than directly from the transmission, and thus the rotation of the shaft 16 is selectively controlled as is any power-take-off shaft. Thus the power is transmitted to bevel gears 23 which are mounted on shaft 24 connected to the respective universal joints 17 and 18. Meshing bevel gears 26 are thus driven by the gears 23 and rotate the shaft 27 and the shaft 28. The shafts 27 and 28 have pulleys indicated at 29 mounted thereon, and belts 31 are trained over the pulleys 29 and also over lower pulleys indicated at 32 such that the latter pulleys are of course driven in the well-known manner. The pulleys 32 are disposed on an axis common to the axis of the reels indicated at 33 of the various lawn mowers designated 34.

Thus FIG. 2 shows the belt 31 extending down to the axis of the reels 33, and the reel shafts 36 and 37 of the forward gang of mowers and the reel shaft 38 of the central rear gang of mowers are thus directly driven by the belt 31 and its pulley 32, which is therefore of course mounted on the axis of the reel shafts and to be directly mounted on the end of the shaft 38, and to be mounted for driving the forward shafts 36 and 37 with a direct drive to the shaft 37, and with a universal joint member 39 intervening between the pulley 32 and the shaft 36. Thus, here also it will be readily understood that a well-known type of pulley drive is provided for direct powering of the three reels mounted on the shafts 36, 37, and 38.

At this time it will also be noted that a forward gang of mowers is supported on the tractor by means of a mounting member 41 which is pivoted through pins 42 on the tractor gears 19. Thus of course the member 41 can move in an up-and-down direction about the axis of the pins 42 and a forwardly disposed and mounting member 43 is attached by means of the connector 44 to the member 41. The member 43 is also pivotally mounted about the axis of the connector 44 and of course this axis is transverse to the axis of the pins 42. Further, a forwardly disposed mounting member 46 is rigid with respect to the member 43 and is therefore a part of the member 43, and it supports connectors 47 at the opposite ends thereof for respective attachment to the frames of the mowers 34.

With the pivotal connections mentioned, it will therefore be understood that complete universal movement of the forwardly disposed mowers 34 is attained as they can pivot in all necessary directions to accommodate irregular terrain encountered in the mowing process. Of course it will be understood that the gears 23 and 26 are disposed in a gear box and remain in mesh as the universal joint moves to accommodate the pivotal movement just described.

The mowers 34 are thus shown to consist of side plates 48 which rotatably support the respective shafts of the lower reels, and the remainder of the mower has the necessary framework such as the pieces 49 and 51 for completing the mower construction with respect to its frame.

At this time it will also be noted that the entire forward gang is shown to consist of four mowers 34, and these are displaceable upwardly as a unit to raise them off the ground and of course to have them supported on the tractor, and to do this, a lifting shaft 52 is mounted on the tractor such as by means of the supporting member 22. The shaft 52 in turn is connected to a link 53 attached to the rod 54 of a power cylinder 56. The latter is also of course mounted on the tractor and a connecting hydraulic line 57 extends to a hydraulic pump indicated "P" mounted on the tractor and having a hydraulic line 58 extending therefrom for connection with the line 57. Thus actuation of the cylinder 56 will cause the shaft 52 to rotate, and the latter is shown to carry two pulleys 59 which have cables 61 thereon and the latter cables 61 extend downwardly to the mounting member 43 and are attached thereto in any conventional manner. Thus it will be readily understood that rotation of the shaft 52 will cause the rotation of the pulleys 59 and wind up the cables 61 and thus lower or raise the member 43. In this manner the entire front gang of four mowers is raised off the ground as desired. Of course the front unit then is pivoting about the mounting pins 42.

The rear gang is shown to consist of three mowers 34, and these are mounted on a member 63 which is pivoted to the tractor by means of the pins 64 extending through the tractor ears 20. Also a pivotal connector 66 extends from the member 63 to pivotally attach the central rear mower 34 thereto. Thus the entire rear gang of mowers can be considered to be pivotal about the axis of the connector 66.

The laterally disposed sides of the mowers 34 toward the outside thereof have mounting arms 67, attached thereto, and supporting pivot pins 68. Arms or rods 69 are thus pivoted on the pins 68 and extend laterally therefrom to connect to yokes 71 attached to the inside portions of each of the four outboard mowers included in the two gangs. Thus with the yokes 71 and with the arms 67 having bifurcated or yoked ends 72, the connections between the inboard mowers 34 and the outboard mowers 34 are stable with respect to the fore-and-aft axis of the tractor so that the necessary stability is achieved for conveying the mowers over the lawn to be mowed as the mowers therefore remain in axial alignment. Of course the connection through the pivot member 69 also permits the outboard mowers 34 to be folded or raised upwardly to be in the position indicated by the dotted mower in FIG. 2.

To accomplish the raising, a hydraulic cylinder 73 is shown mounted on the inboard mowers and the cylinder's rod 74 extends to form a pivotal connection with the outboard mowers by means of a pivot pin 76 supported on a bracket 77 rigidly connected to the frame of the outboard mowers. Thus FIG. 2 shows the arrangement, and of course the cylinder 73 is pivotally mounted on the mower through the mower's bracket 78 which supports the pivot 79. Accordingly, the power applied to the cylinder 73 through its hydraulic line 81 will cause the mower to be raised in the dotted position shown in FIG. 2. Again the power for the cylinder 73 can be supplied by the hydraulic pump "P."

With this arrangement it will therefore be understood that all of the four outboard mowers can be raised by means of the respective cylinders 73. At this time it will also be further noted that the arm 69 shown connected between the inboard and outboard mower on the rear gang has its pivot pin 68 extending therefrom to an end 82, and a link 83 shown in FIG. 2 is non-rotatably attached to the end 82 to rotate therewith and with the rotation of the arm 69. The upper end of the link 83 has a weight transfer tension spring 84 attached thereto, and the spring upper end 86 is thus of course mounted on the tractor in any conventional manner of anchoring the spring 84. It will therefore be understood that when the rear outboard mower 34 is raised, the link 83 is pivoted counter-clockwise as viewed in FIG. 2 about the axis of pin 82 and this movement of course lengthens the spring 84 to place it under greater tension. Therefore, the spring 84 is supporting the weight of the outboard mower 34 so that the latter is not, at least entirely, resting upon the inboard mower 34 when the mower is raised. The raised mower 34 therefore does not have its heavy weight bearing down on the inboard mower 34 which may still be in mowing operation. Thus the considerable weight of the mower and its bulk, including the rollers 87, are supported on the tractor by means of the spring 84 to the extent that the spring is made sufficiently stiff.

With respect to the drive of the various mowers, it will also be understood that the inboard mowers 34 are driven as described, and the outboard mowers are driven by the driving connector 88 which has a universal joint 89 on each end thereof to respectively connect to the inwardly disposed shaft 91 and the shaft 92 of the outboard mowers. In this manner the drive is of course transmitted to the outboard mowers, but of course because of the universal connections 89, the outboard mowers can be raised as described.

An important feature of the construction shown is a provision for discontinuing the drive to the outboard mowers 34 when the latter are raised. To accomplish this, an electric clutch 93 is shown intermediate the shaft 91 and thus the clutch operates between the inboard mower reels 36, 37, and 38 and the outboard mower reels and their respective shafts.

A clutch control means generally designated 94 is also disposed to react with the raising of the outboard mower 34 and to thus automatically disengage the clutches 93 and therefore to discontinue the power to the outboard mowers 34 when the latter are raised. In the shown embodiment, the means 94 is of course an electric type of switch for the electric clutch 93, and the switch 96 has a link 97 extending therefrom to connect to a link 98 pivotally attached through pin 99 to the connector 69. It will therefore be understood that upon raising the outboard mower 34, the link 98 will be displaced upwardly to pivot the link 97 and actuate the switch 96. Connecting wires 101 extending between the switch 96 and the clutch 93 cause the latter to be disengaged and thus the power to the outboard reel is interrupted. It will of course be understood that the switch 101 will not terminate the engagement of the clutch 93 with only a minor pivotal motion of the outboard mowers 34 such as the motion encountered in mowing operations where the terrain is of course higher at the location of the outboard mowers. Instead, of course, the switch 101 will be effective when the mower 34 is raised to the inoperative position. Of course it will be understood that there will be a clutch and a switch or clutch control means interposed between each of the inboard mowers and their adjacent outboard mowers such that when the latter are raised, they will all be disconnected with respect to the power transmitted thereto. Of course the raising of the mowers can be done separately with each of the outboard mowers and then only that mower will be disconnected in its drive. The means and manner of raising both the front and the rear gangs as a unit have been described as including the pulleys 59 and the cables 61, and this means is employed somewhat similar to that shown in U.S. Patent No. 2,325,252 where the lifting pulleys are employed for pivotally raising the mowers.

While a specific embodiment of this application has been shown and described, it should be obvious that certain changes could be made therein and the invention therefore should be determined only by the scope of the appended claims.

What is claimed is:

1. A gang lawn mower for mounting onto a propelling tractor, comprising a first lawn mower mounted on said tractor, additional lawn mowers pivotally attached to said first lawn mower on the opposite sides thereof for up and down pivotal movement on said first lawn mower, power means operatively interconnected between said tractor and said first lawn mower for operating the latter, a clutch and a power transmission means operatively interconnected between said first lawn mower and each of said additional lawn mowers for operating the latter off the power of said first lawn mower, and clutch control means disposed adjacent each said clutch and being connected thereto and to said additional lawn mowers and being operative in response to pivoting the latter for governing the transmission of power through each said clutch.

2. A gang lawn mower for mounting onto a propelling tractor, comprising a first lawn mower mounted on said tractor, additional lawn mowers pivotally attached to said first lawn mower on the opposite sides thereof for up and down pivotal movement on said first lawn mower, lift means operatively interconnected between said first lawn mower and each of said additional mowers for pivotally raising the latter independent of each other, power means operatively interconnected between said tractor and each of said lawn mowers for operating the latter, a clutch included in said power means and disposed intermediate said first lawn mower and each of said additional lawn mowers, and clutch control means operatively interconnected between said clutch and said additional lawn mowers and being operable in response to pivotally raising the latter and to thereby disengage said clutch.

3. A universally articulated gang lawn mower for mounting onto a propelling tractor having a support thereon and a power take-off shaft for operating the lawn mowers, comprising a mounting member pivotally mounted on said support with a pivot axis oriented for upright pivotal movement of said first mounting member about a first axis, a pivot connector mounted on said mounting member and having a pivot axis oriented transverse to said first axis, a centrally disposed first lawn mower attached to said pivot connector for pivotal movement, additional lawn mowers pivotally attached to opposite ends of said first lawn mower for up and down additional movement on the latter, power means operatively interconnected between said power-take-off shaft and said lawn mowers for operating the latter, a clutch operatively included in said power means connected to said additional lawn mowers for operating the latter, and clutch control means disposed adjacent said clutch and being connected thereto and to said additional lawn mowers for actuation in response to said additional pivotal movement of the latter and to thereby govern the transmission of power through said clutch.

4. A universally articulated gang lawn mower for mounting onto a propelling tractor having a support thereon and a power-take-off shaft for operating the lawn mowers, comprising a mounting member pivotally mounted on said support and having a pivot axis oriented for upright pivotal movement of said first mounting member about a first axis, a pivot connector mounted on said mounting member and having a pivot axis oriented transverse to said first axis, a centrally disposed first lawn mower attached to said pivot connector for pivotal movement, additional lawn mowers pivotally attached to opposite ends of said first lawn mower for up and down additional pivotal movement on the latter, lifting means mounted on said first lawn mower and being independently attached to said additional lawn mowers for selective raising of each of the latter, power means operatively interconnected between said power-take-off shaft and all said lawn mowers for operating the latter, a clutch included in said power means and disposed intermediate said first lawn mower and each of said additional lawn mowers for operating the latter, and clutch control means disposed adjacent each said clutch and being connected thereto and to said additional lawn mowers for actuation in response to said additional pivotal movement of the latter and to thereby govern the transmission of power through each of said clutch.

5. A gang lawn mower for mounting onto a propelling tractor having a support thereon, comprising a first mounting member pivotally mounted on said support and having a pivot axis oriented for up and down pivotal movement of said first mounting member about a first axis, a second mounting member pivotally mounted on said first mounting member and having a pivot axis oriented for pivotal movement of said second mounting member about an axis transverse to said first axis, a pair of pivot connectors mounted on said second mounting member and having pivot axes oriented transverse to said first axis, a pair of lawn mowers attached to said connectors for pivotal movement about said axes thereof, additional lawn mowers pivotally attached to said pair of lawn mowers and disposed laterally thereof for up and down additional pivotal movement on the latter said pair, power means operatively interconnected between said tractor and said pair of lawn mowers for operating the latter, a clutch and a power transmission means operatively interconnected between said pair of lawn mowers and said additional lawn mowers for empowering the latter, and clutch control means disposed adjacent each said clutch and being connected thereto and to said additional lawn mowers for actuation in response to said additional pivotal movement of the latter and to thereby govern the transmission of power through each said clutch.

6. A gang lawn mower for mounting onto a propelling tractor, comprising a first lawn mower mounted on said tractor, additional lawn mowers pivotally attached to said first lawn mower on the opposite sides thereof for up and down pivotal movement on said first lawn mower, lift means operatively interconnected between said first lawn mower and each of said additional mowers for pivotally raising the latter independent of each other, power means operatively interconnected between said tractor and each of said lawn mowers for operating the latter, a clutch included in said power means and disposed intermediate said first lawn mower and each of said additional lawn mowers, clutch control means operatively interconnected between said clutch and said additional lawn mowers and being operable in response to pivotally raising the latter and to thereby disengage said clutch, and weight-transfer means operatively interconnected between said tractor and said additional lawn mowers and adapted to force upwardly on the latter in response to pivotally raising the latter and to thereby support the weight of the latter on said tractor.

7. A universally articulated gang lawn mower for mounting onto a propelling tractor having a support thereon and a power-take-off shaft for operating the lawn mowers, comprising a mounting member pivotally mounted on said support and having a pivot axis oriented for upright pivotal movement of said first mounting member about a first axis, a pivot connector mounted on said mounting member and having a pivot axis oriented transverse to said first axis, a centrally disposed first lawn mower attached to said pivot connector for pivotal movement, additional lawn mowers pivotally attached to opposite ends of said first lawn mower for up and down additional pivotal movement on the latter, lifting means mounted on said first lawn mower and being independently attached to said additional lawn mowers for selective raising of each of the latter, a member on one of said additional lawn mowers for pivoting downwardly in response to upward pivotal movement of the remainder of said one of said additional lawn mowers, a tension spring attached between said tractor and said member in a position to extend upon said pivotal movement and thereby support the weight of said one of said additional lawn mowers on said tractor, power means operatively interconnected between said power-take-off shaft and all said lawn mowers for operating the latter, a clutch included in said power means and disposed intermediate said first lawn mower and each of said additional lawn mowers for operating the latter, and clutch control means disposed adjacent each said clutch and being connected thereto and to said additional lawn mowers for actuation in response to said additional pivotal movement of the latter and to thereby govern the transmission of power through each said clutch.

References Cited in the file of this patent

UNITED STATES PATENTS

| | | |
|---|---|---|
| 1,693,475 | Clapper | Nov. 27, 1928 |
| 2,191,426 | Clapper | Feb. 20, 1940 |
| 2,672,000 | Speiser | Mar. 16, 1954 |
| 2,682,740 | Miller et al. | July 6, 1954 |
| 2,724,227 | Godwin | Nov. 22, 1955 |